Dec. 22, 1959  H. FRIEDMAN  2,918,578
GAS DETECTION
Filed May 28, 1954
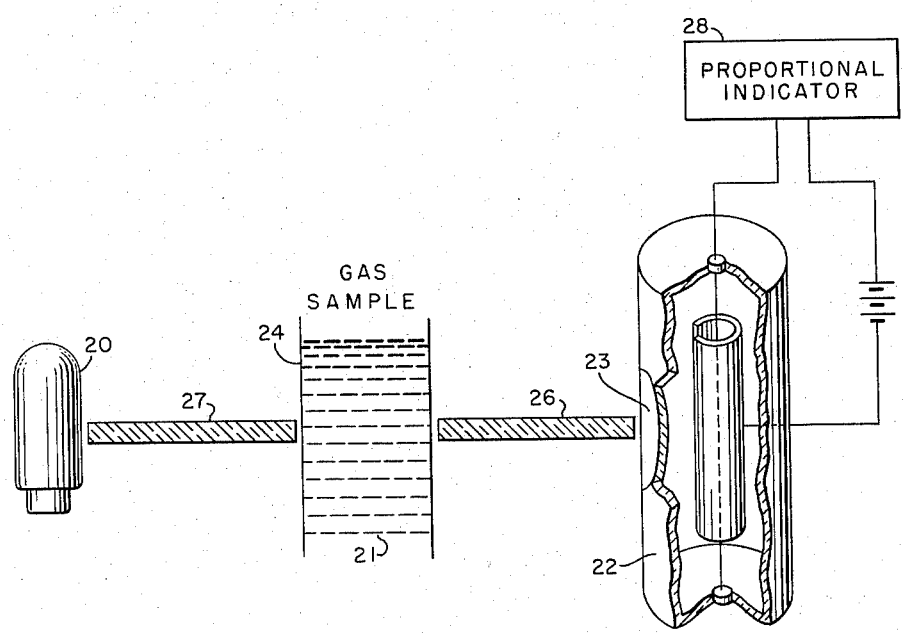
INVENTOR
HERBERT FRIEDMAN
BY *D.C. Snyder*
*Howard White*  ATTORNEYS

United States Patent Office 2,918,578
Patented Dec. 22, 1959

2,918,578

GAS DETECTION

Herbert Friedman, Arlington, Va.

Application May 28, 1954, Serial No. 433,308

19 Claims. (Cl. 250—43.5)

(Granted under Title 35, U.S. Code (1952), sec. 266)

The invention described herein may be manufactured and used by or for the Government of the United States of America for governmental purposes without the payment of any royalties thereon or therefor.

This invention relates to the quantitative determination of gas composition, and particularly to the determination of the amount of a selected component of a mixed gas. This application is a continuation in part of my application Serial No. 292,599 filed June 9, 1952, for Monochromatic Photon Counters, now abandoned, disclosure of which is hereby incorporated by reference. The counters of application Serial No. 292,599 operate over a limited frequency range determined by their gas filling and envelope transmission characteristics. The present invention is related to the system of Figure 4 of that application, wherein a radiation source, a gas sample, and a detector of the transmitted radiation is disclosed.

An object of the present invention is to determine the percentage component composition of a mixed gas sample.

A further object of the invention is to determine the relative composition of a mixed gas sample comprising oxygen and water vapor.

Another object of the present invention is to determine the amount of oxygen and/or water vapor in a sample of air.

As will be understood, in systems operating by attenuation of radiant energy, the mass of absorber in the energy path is the controlling parameter. In a sample cell of fixed size, the mass is proportional to pressure, and the detector may be so calibrated. If the cell pressure is maintained constant by suitable pressure control means, the absorbent mass of a component may vary by composition variation in the enclosed gas mixture. The detector may then be calibrated in terms of percent composition of the varying component.

An exemplary apparatus for making an analysis is depicted in schematic form in the figure. With reference thereto, a source of broadband radiation 20, such as for example a hydrogen arc discharge tube, is disposed at one side of a gas sample cell 21 having walls essentially transparent to the operative wave lengths. On the other side of the sample 21 is radiation detection device 22, so disposed as to intercept radiation from source 20 transmitted through the sample, and provided with a suitable gas-additive to establish a lower frequency limit of operation. Detection device 22 may be provided with an incident radiation window filter 23. Alternatively, however, the filter 23 may be placed as shown at 26 and terminating closely adjacent the sample 21. Optionally, the filter 26 may be complemented by another filter 27 intermediate source 20 and sample 21. In this way filters 26 and 27 serve to provide a confined radiation transmission path from source 20 to sample 21, and thence to detection device 22, while at the same time establishing the upper frequency limit for the monochromatic operation of radiation detection device 22. When filter 26 is used, window 23 may be transparent generally, or may constitute a supplementary filter.

In addition to utility in spectroanalysis and the like, as above described, radiation detection devices as disclosed in application Serial No. 292,599, and further herein, capable of monochromatic operation, are highly useful in making quantitative measurements of the density of individual constituents of a gas sample, such as for example the amount of oxygen or water vapor in an air sample. Such measurements may be obtained by calibrating the response of a proportional indicator 28 for the radiation detection device provided with a filter and gas-additive for monochromatic operation in a frequency band coincident with a point of high absorption of the constituent to be measured and relatively low absorption of other variable components. Molecular oxygen, for example, is known to be highly absorbent of radiation in the band from about 1400 to 1600 Angstroms. Water vapor presents relatively low absorption in the frequency band of 1400 to 1600 Angstroms. A detection device provided with sapphire for the filter means, and, as a gas-additive, about 0.1 percent by volume of bromine, would therefore serve in the arrangement shown in the figure as a highly satisfactory oxygen density meter, or percentage oxygen indicator under stabilized pressure.

To determine the amount of water vapor in a mixed sample including oxygen, it is preferred to use radiation at 1216 reciprocal Angstroms. At this frequency water vapor is highly absorbent, a narrow highly transmissive band occurs in oxygen, and a highly efficient source is available in the Lyman alpha line of excited hydrogen.

For the purposes of detecting the radiation passed by the sample under these conditions, suitable counters described in application Serial No. 292,599 may be employed. Other counting mixtures including electronegative gases may be used, and such counters have general application also.

An electronegative gas component giving an effective high wavelength sensitivity cut-off at about 1340 Angstroms is nitric oxide. The counter operates excellently with 10% NO, 90% rare gas in the filling. The NO may exceed 30%, but is not satisfactory at low amounts such as 1%. Such a counter would be used with a lithium fluoride filter for selective responsive to a limited band from 1050 to 1340 Angstroms, including the desired 1216 Angstroms.

The high wave length cut-off characteristic of nitric oxide-rare gas fillings is intermediate between chlorine and bromine tubes described in application Serial No. 292,599 (see Fig. 2 thereof). The chlorine tube is also useful with a lithium fluoride filter at 1216 Angstroms.

It has been discovered that a further admixture of water vapor to the halogen counter fillings described in application Serial No. 292,599 increases the sensitivity of the tubes by a factor of 10 to 100 times without materially affecting the frequency limits involved in their operation. Water vapor in amounts of a fraction of a millimeter to 5 millimeters of mercury in the filling mixture is effective for this purpose. Such water vapor-chlorine-rare gas counter is also particularly effective for 1216 Angstroms response with a lithium fluoride filter.

In the systems shown in the figure, the filter 27 may be a cell containing pure oxygen which is effective to block the hydrogen radiation substantially totally with the exception of the desired Lyman alpha line at 1216 Angstroms.

While a conventional hydrogen discharge tube, normally containing the gas at a pressure of one to a few millimeters of mercury, may be used as source 20, such tubes radiate much energy at undesired frequencies. It has been found that atomic hydrogen may be excited to emit 1216 Angstroms radiation substantially free of adjacent molecular hydrogen lines in a discharge tube filled with any of the rare gases and 10% hydrogen at the same range of total pressures as conventionally used. The undesired adjacent hydrogen radiation is quenched with retention of the desired Lyman alpha line in tubes having a minor proportion, from a trace to above 10%, of hydrogen with the remainder of the filling rare gas. For the specific application to detecting water vapor in the presence of oxygen, neon and krypton are preferred rare gases because they themselves do not emit in the adjacent regions around 1216 Angstroms.

What is claimed is:

1. A far ultraviolet gas analysis apparatus for detecting water vapor in an atmosphere containing oxygen comprising a hydrogen discharge source emitting ultraviolet radiation including a strong line at the Lyman alpha wavelength of 1216 Angstroms, means for directing said radiation through said atmosphere containing said water vapor, an ionizable gas detector tube positioned to receive said radiation which passes through said atmosphere, said detector having a pair of spaced electrodes within a sealed envelope, filter means for said radiation which transmits ultraviolet of 1216 Angstroms and does not transmit substantially shorter wavelengths incident upon said detector, a rare gas filling within said envelope and including an electronegative gas for establishing a far ultraviolet threshold for said tube slightly above 1216 Angstroms, and utilization means responsive to said detector.

2. A far ultraviolet gas analysis apparatus for detecting water vapor in an atmosphere containing oxygen comprising a hydrogen discharge source emitting ultraviolet radiation including a strong line at the Lyman alpha wavelength of 1216 Angstroms, means for directing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope comprising nitric oxide and a rare gas, and utilization means responsive to said detector.

3. A far ultraviolet gas analysis apparatus for detecting water vapor in an atmosphere containing oxygen comprising a hydrogen discharge source emitting ultraviolet radiation including a strong line at the Lyman alpha wavelength of 1216 Angstroms, means for directing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope comprising a mixture of halogen gas and a rare gas, and utilization means responsive to said detector.

4. A far ultraviolet gas analysis apparatus for detecting water vapor in an atmosphere containing oxygen comprising a hydrogen discharge source emitting ultraviolet radiation including a strong line at the Lyman alpha wavelength of 1216 Angstroms, means for directing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope comprising a mixture of halogen gas, a rare gas, and water vapor, and utilization means responsive to said detector.

5. A far ultraviolet gas analysis apparatus for detecting water vapor in an atmosphere containing oxygen comprising a discharge tube containing a mixture of rare gas and hydrogen for generating substantially monochromatic ultraviolet radiation at 1216 Angstroms, means for passing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope comprising nitric oxide and a rare gas, and utilization means responsive to said detector.

6. A far ultraviolet gas analysis apparatus for detecting water vapor in an atmosphere containing oxygen comprising a discharge tube containing a mixture of neon and krypton and hydrogen for generating substantially monochromatic ultraviolet radiation at 1216 Angstroms, means for passing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope comprising nitric oxide and a rare gas, and utilization means responsive to said detector.

7. A far ultraviolet gas analysis apparatus for detecting water vapor in an atmosphere containing oxygen comprising a discharge tube containing a mixture of rare gas and hydrogen for generating substantially monochromatic ultraviolet radiation at 1216 Angstroms, means for passing said radiation through said atmosphere containing said water vapor, an ionizable gas detector tube positioned to receive said radiation which passes through said atmosphere, said detector having a pair of spaced electrodes within a sealed envelope, a lithium fluoride window in said envelope for said radiation, a gas filling within said envelope including electronegative gas for establishing a far ultraviolet threshold for said tube slightly above 1216 Angstroms, and utilization means responsive to said detector.

8. A far ultraviolet gas analysis apparatus for detecting oxygen in a mixture with a relatively transparent atmosphere comprising a discharge source containing rare gas emitting ultraviolet line radiation between 1400 and 1500 Angstroms, means for passing said radiation through said atmosphere containing said oxygen, an ionizable gas detector tube positioned to receive said radiation which passes through said atmosphere, said detector having a pair of spaced electrodes within a sealed envelope, a sapphire filter for said radiation, a gas filling within said envelope comprising a rare gas and bromine, and utilization means responsive to said detector.

9. A far ultraviolet gas analysis apparatus for detecting water vapor in an atmosphere containing oxygen comprising a hydrogen discharge tube for generating ultraviolet radiation, a filter containing a substantial portion of oxygen gas positioned to intercept said radiation, said filter transmitting therethrough substantially only the Lyman alpha line of said radiation at 1216 Angstroms wavelength, means for directing said radiation through said atmosphere containing said water vapor, an ionizable gas detector tube positioned to receive said radiation which passes through said atmosphere, said detector having a pair of spaced electrodes within a sealed envelope, a lithium fluoride filter for blocking ultraviolet radiation substantially below said 1216 Angstroms wavelength and transmitting longer wavelengths incident upon said detector, a gas filling within said envelope comprising a rare gas and an electronegative gas to establish a far ultraviolet threshold slightly above said 1216 Angstroms wavelength, and utilization means responsive to said detector.

10. An ionizable gas narrow band ultraviolet detector comprising means for enclosing a volume of gas in a sealed envelope, a pair of electrodes positioned in spaced relation within said envelope, and a lithium fluoride window for admitting only ultraviolet radiation of wavelength longer than 1050 Angstroms into said volume, said gas comprising a mixture of a rare gas and nitric oxide.

11. An ionizable gas narrow band ultraviolet detector comprising means for enclosing a volume of gas in a sealed envelope, a pair of electrodes positioned in spaced relation within said envelope, and a lithium fluoride window for admitting only ultraviolet radiation of wavelength longer than 1050 Angstroms into said volume, said gas comprising a mixture of a rare gas and chlorine.

12. An ionizable gas narrow band ultraviolet detector comprising means for enclosing a volume of gas in a sealed envelope, a pair of electrodes positioned in spaced relation within said envelope, and a lithium fluoride window for admitting only ultraviolet radiation of wavelength longer than 1050 Angstroms into said volume, said gas comprising a mixture of a rare gas, chlorine and water vapor.

13. An ionizable gas narrow band ultraviolet detector comprising means for enclosing a volume of gas in a sealed envelope, a pair of electrodes positioned in spaced relation within said envelope, and a sapphire filter for admitting only ultraviolet radiation of wavelength longer than 1425 Angstroms into said volume, said gas comprising a mixture of a rare gas and bromine.

14. An ionizable gas narrow band ultraviolet detector comprising means for enclosing a volume of gas in a sealed envelope, a pair of electrodes positioned in spaced relation within said envelope, and a sapphire filter for admitting only ultraviolet radiation of wavelength longer than 1425 Angstroms into said volume, said gas comprising a mixture of a rare gas, bromine and water vapor.

15. A source of far ultraviolet Lyman alpha radiation at 1216 Angstroms comprising an enclosed discharge tube, a lithium fluoride window in said tube, spaced discharge electrodes for said tube and a gas filling for said tube of a rare gas and hydrogen in an amount from about 0.1% to about 10%.

16. A source of far ultraviolet Lyman alpha radiation at 1216 Angstroms comprising an enclosed discharge tube, a lithium fluoride window in said tube, spaced discharge electrodes for said tube and a gas filling for said tube of hydrogen in amount from about 0.1% to about 10% and rare gas selected from the group of neon and krypton.

17. A source of far ultraviolet Lyman alpha radiation at 1216 Angstroms comprising a hydrogen arc discharge tube for generating broadband ultraviolet energy and a filter for said radiation comprising substantially pure oxygen.

18. A source of far ultraviolet Lyman alpha radiation at 1216 Angstroms comprising an enclosed discharge tube, a lithium fluoride window in said tube, a gas filling for said tube comprising a mixture of rare gas and of hydrogen in amount from about 0.1% to about 10%, and means for generating an ionized discharge in said tube.

19. A far ultraviolet gas analysis apparatus for detecting water vapor in an atmosphere containing oxygen comprising a hydrogen discharge source emitting ultraviolet radiation including a strong line at the Lyman alpha wavelength of 1216 Angstroms, means for directing said radiation through said atmosphere containing said water vapor, an ionizable gas detector tube positioned to receive said radiation which passes through said atmosphere, said detector haivng a pair of spaced electrodes within a sealed envelope, filter means for said radiation which transmits ultraviolet of 1216 Angstroms and does not transmit substantially shorter wavelengths incident upon said detector, an electronegative gas filling said envelope for establishing a far ultraviolet threshold for said tube slightly above 1216 Angstroms, and utilization means responsive to said detector.

References Cited in the file of this patent

UNITED STATES PATENTS

| | | |
|---|---|---|
| 2,261,215 | Bird | Nov. 4, 1941 |
| 2,265,357 | Demarest | Dec. 9, 1941 |
| 2,327,539 | McAlister | Aug. 24, 1943 |
| 2,468,638 | Rosenbaum | Apr. 26, 1949 |
| 2,512,773 | Herzog et al. | June 27, 1950 |
| 2,552,723 | Koury | May 15, 1951 |
| 2,599,352 | Schneider | June 13, 1952 |
| 2,712,088 | Whitman | June 28, 1955 |
| 2,715,195 | Friedman | Aug. 9, 1955 |
| 2,729,762 | Hagen et al. | Jan. 3, 1956 |
| 2,764,692 | Miller | Sept. 25, 1956 |
| 2,831,122 | Brucer | Apr. 15, 1958 |

OTHER REFERENCES

Electron and Nuclear Counters, by S. A. Korff, D. Van Nostrand Company, copyright 1946, fourth printing January 1948, pages 81 to 83.